(12) United States Patent
Kim et al.

(10) Patent No.: US 12,284,415 B2
(45) Date of Patent: Apr. 22, 2025

(54) METHOD AND SYSTEM FOR PLAYING STREAMING CONTENT

(71) Applicant: NAVER CORPORATION, Seongnam-si (KR)

(72) Inventors: SungHo Kim, Seongnam-si (KR); SungTaek Cho, Seongnam-si (KR); JaeChul Ahn, Seongnam-si (KR); Hyundong Hwang, Seongnam-si (KR); Byung Gyou Choi, Seongnam-si (KR); Jonghyeok Lee, Seongnam-si (KR); Songhyun Park, Seongnam-si (KR); Yongmaroo Kim, Seongnam-si (KR); Joon-kee Chang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 287 days.

(21) Appl. No.: 17/650,692

(22) Filed: Feb. 11, 2022

(65) Prior Publication Data

US 2022/0167043 A1    May 26, 2022

Related U.S. Application Data

(63) Continuation of application No. PCT/KR2020/010676, filed on Aug. 12, 2020.

(30) Foreign Application Priority Data

Aug. 12, 2019  (KR) .......................... 10-2019-0098424

(51) Int. Cl.
*H04N 7/173*   (2011.01)
*H04N 21/433*  (2011.01)
(Continued)

(52) U.S. Cl.
CPC ....... *H04N 21/437* (2013.01); *H04N 21/4331* (2013.01); *H04N 21/47217* (2013.01); *H04N 21/4825* (2013.01)

(58) Field of Classification Search
CPC ............. H04N 21/437; H04N 21/4331; H04N 21/47217; H04N 21/4825; H04N 21/8456;
(Continued)

(56) References Cited

U.S. PATENT DOCUMENTS 10,123,087 B1 *  11/2018  Killick ............... H04N 21/8455
10,178,191 B1 *   1/2019  Farhangi .............. H04L 67/146
(Continued)

FOREIGN PATENT DOCUMENTS

KR    1020060081330 A    7/2006
KR    1020070111310 A    11/2007
(Continued)

OTHER PUBLICATIONS

Int'l Search Report issued in PCT/KR/2020/010676, mailed Oct. 30, 2020.

*Primary Examiner* — Jefferey F Harold
*Assistant Examiner* — Sahar Aqil Riaz
(74) *Attorney, Agent, or Firm* — Greer Burns & Crain Ltd.

(57) ABSTRACT

A method for playing streaming content includes requesting a playlist from a streaming server for providing a streaming service; receiving, in response to the request, a streaming fragment template provided by the streaming server; separating the playlist, a manifest file, and track information included in the streaming fragment template; and processing the play of the streaming content requested from a player module by using at least one of the playlist, the manifest file, and the track information.

4 Claims, 6 Drawing Sheets

(51) Int. Cl.
   *H04N 21/437*      (2011.01)
   *H04N 21/472*      (2011.01)
   *H04N 21/482*      (2011.01)

(58) Field of Classification Search
   CPC ....... H04N 21/26258; H04N 21/47202; H04N 21/482
   USPC .......................................................... 725/86
   See application file for complete search history.

(56) References Cited

U.S. PATENT DOCUMENTS

| | | | |
|---|---|---|---|
| 10,743,037 B1* | 8/2020 | Vantalon | H04N 21/23106 |
| 10,798,145 B1* | 10/2020 | Garney | H04N 21/2407 |
| 11,076,187 B2* | 7/2021 | Kalagi | H04N 21/2662 |
| 2011/0106618 A1* | 5/2011 | Ben-Moshe | G06Q 99/00 |
| | | | 705/500 |
| 2013/0332971 A1* | 12/2013 | Fisher | H04N 21/8456 |
| | | | 725/93 |
| 2014/0150019 A1* | 5/2014 | Ma | H04N 21/458 |
| | | | 725/34 |
| 2014/0270167 A1* | 9/2014 | Cureau | H04N 21/47202 |
| | | | 380/201 |
| 2015/0304196 A1* | 10/2015 | Sun | H04N 21/64322 |
| | | | 709/219 |
| 2015/0334335 A1* | 11/2015 | White | H04N 21/4222 |
| | | | 348/734 |
| 2017/0013034 A1* | 1/2017 | Chung | G06F 21/10 |
| 2017/0026686 A1* | 1/2017 | Glazier | H04N 21/41407 |
| 2017/0188071 A1* | 6/2017 | Fuller | H04L 65/70 |
| 2018/0302692 A1* | 10/2018 | Lacivita | H04N 21/4623 |
| 2018/0338166 A1* | 11/2018 | Amiga | H04N 21/6125 |
| 2019/0146951 A1* | 5/2019 | Velmurugan | H04L 67/02 |
| | | | 707/822 |
| 2021/0136464 A1* | 5/2021 | Lacivita | H04N 21/4623 |
| 2022/0191558 A1* | 6/2022 | Kim | H04N 21/6581 |
| 2024/0223637 A1* | 7/2024 | Gordon | H04L 67/02 |

FOREIGN PATENT DOCUMENTS

| | | |
|---|---|---|
| KR | 1020130082164 A | 7/2013 |
| KR | 101397183 B1 | 5/2014 |
| KR | 1020150119168 A | 10/2015 |
| KR | 101668957 B1 | 10/2016 |
| KR | 102134250 B1 | 7/2020 |

\* cited by examiner

METHOD AND SYSTEM FOR PLAYING STREAMING CONTENT

CROSS-REFERENCE TO RELATED APPLICATIONS

This is a continuation application of International Application No. PCT/KR2020/010676, filed Aug. 12, 2020, which claims the benefit of Korean Patent Application No. 10-2019-0098424, filed Aug. 12, 2019.

BACKGROUND OF THE INVENTION

Field of Invention

One or more example embodiments of the present invention relate to a method and system for playing back streaming content.

Description of Related Art

An example of an existing solution for playback of streaming content includes HTTP Live Streaming (HLS), Moving Picture Experts Group—Dynamic Adaptive Streaming over HTTP (MPEG-DASH), MPEG-4 (mp4), and the like. For example, a method and apparatus for managing a playlist file in a streaming service is disclosed in Korean Patent Registration No. 10-1397183.

Such existing solutions are in a structure in which a plurality of requests and responses are transmitted and received until video content is actually received. For example, before requesting and downloading "0.ts" file that is actual first frame data, HLS has a structure in which a client needs to sequentially process in advance a process of requesting a server a content list (playinfo) and receiving a response thereto and then requesting a manifest file (master.m3u8) and receiving a response thereto and then requesting again track information (#N playlist.m3u8) and receiving a response thereto and then request a fragment file ({host}/{clipID}/{trackID}-0.ts) for the "0.ts" file. It is similar in other existing solutions.

BRIEF SUMMARY OF THE INVENTION

One or more example embodiments provide a streaming content playback method and system that may reduce the number of consecutive requests, such as a request for a content list, a request for a manifest file, a request for track information, and a request for a fragment file, in a streaming service of HTTP Live Streaming (HLS), Moving Picture Experts Group—Dynamic Adaptive Streaming over HTTP (MPEG-DASH), MPEG-4 (mp4), and the like.

According to an aspect of at least one example embodiment, there is provided a streaming content playback method of a computer apparatus having at least one processor, the streaming content playback method including requesting, by the at least one processor, a streaming server providing a streaming service for a playlist; receiving, by the at least one processor, a streaming fragment template provided from the streaming server in response to the request; separating, by the at least one processor, a playlist, a manifest file, and track information included in the streaming fragment template; and processing, by the at least one processor, playback of streaming content requested from a player module using at least one of the playlist, the manifest file, and the track information.

According to an aspect of at least one example embodiment, the streaming fragment template may be generated in the streaming server to include the playlist, a manifest file for each of streams included in the playlist, and track information for each of the streams.

According to another aspect of at least one example embodiment, the streaming content playback method may further include caching the separated playlist, manifest file, and track information. The processing of the playback of the streaming content may include hooking a request for at least one of the manifest file and the track information from the player module and providing at least one of the cached manifest file and the track information to the player module in response to the hooked request and the processing of the playback of the streaming content.

According to an aspect of at least one example embodiment, there is provided a streaming content playback method of a computer apparatus having at least one processor, the streaming content playback method including generating, by the at least one processor, a streaming fragment template that includes a playlist, a manifest file, and track information; and providing, by the at least one processor, the streaming fragment template in response to a request for a playlist from a client.

According to an aspect of at least one example embodiment, there is provided a computer program stored in a computer-readable record medium to implement the method in a computer apparatus in conjunction with the computer apparatus.

According to an aspect of at least one example embodiment, there is provided a computer-readable record medium storing a computer program to implement the method in a computer apparatus According to an aspect of at least one example embodiment, there is provided a computer apparatus including at least one processor configured to execute a computer-readable instruction. The at least one processor is configured to cause the computer apparatus to request a streaming server providing a streaming service for a playlist, to receive a streaming fragment template provided from the streaming server in response to the request, to separate a playlist, a manifest file, and track information included in the streaming fragment template, and to process playback of streaming content requested from a player module using at least one of the playlist, the manifest file, and the track information.

According to an aspect of at least one example embodiment, there is provided a computer apparatus including at least one processor configured to execute a computer-readable instruction. The at least one processor is configured to cause the computer apparatus to generate a streaming fragment template that includes a playlist, a manifest file, and track information, and to provide the streaming fragment template in response to a request for a playlist from a client.

According to some example embodiments, it is possible to reduce the number of consecutive requests, such as a request for a content list, a request for a manifest file, a request for track information, and a request for a fragment file, in a streaming service of HTTP Live Streaming (HLS), Moving Picture Experts Group—Dynamic Adaptive Streaming over HTTP (MPEG-DASH), MPEG-4 (mp4), and the like.

DETAILED DESCRIPTION OF THE INVENTION

Hereinafter, some example embodiments will be described with reference to the accompanying drawings.

A streaming content playback system according to the example embodiments may be implemented by at least one computer apparatus, and a streaming content playback method according to the example embodiments may be performed by at least one computer apparatus included in a group call system. Here, a computer program according to an example embodiment may be installed and executed on the computer apparatus, and the computer apparatus may perform the streaming content playback method according to the example embodiments under the control of the executed computer program. The aforementioned computer program may be stored in a computer-readable storage medium to computer-implement the streaming content playback method in conjunction with the computer apparatus.

Figure 1:
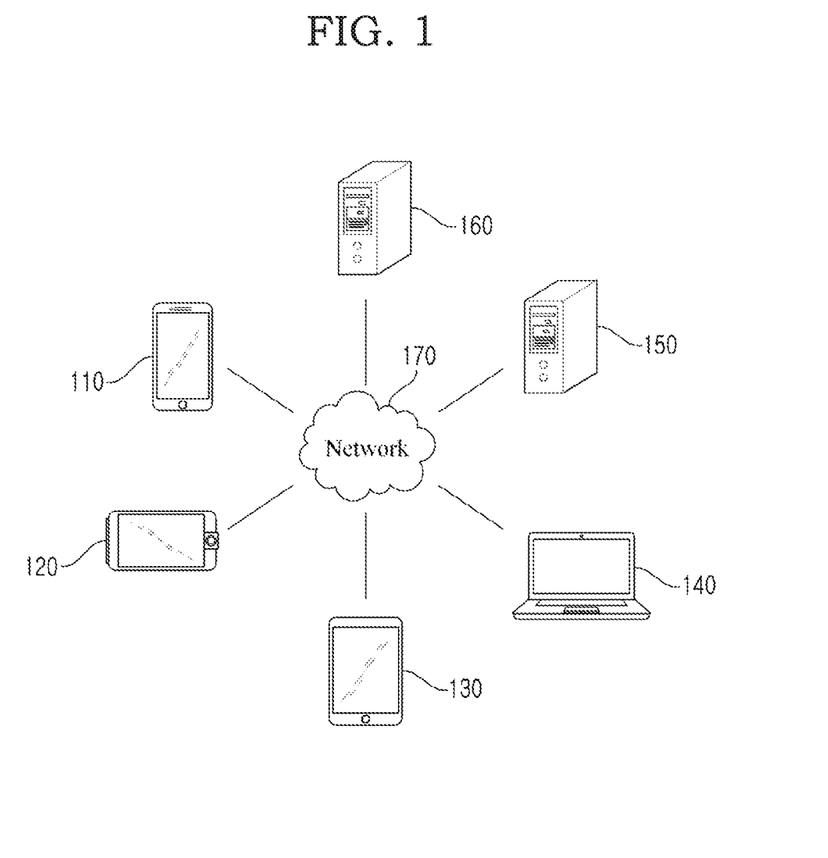
FIG. 1 is a diagram illustrating an example of a network environment according to an example embodiment.

FIG. 1 illustrates an example of a network environment according to an example embodiment. Referring to FIG. 1, the network environment may include a plurality of electronic devices 110, 120, 130, and 140, a plurality of servers 150 and 160, and a network 170. FIG. 1 is provided as an example only. The number of electronic devices or the number of servers is not limited thereto. Also, the network environment of FIG. 1 is provided as an example only among environments applicable to the example embodiments and the environment applicable to the example embodiments is not limited to the network environment of FIG. 1.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet personal computer (PC), and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provide an instruction, a code, a file, content, a service, etc., through communication with the plurality of electronic devices 110, 120, 130, and 140 over the network 170. For example, the server 150 may be a system that provides a service (e.g., a group call service (or an audio conference service), a messaging service, a mail service, a social network service, a map service, a translation service, a financial service, a payment service, a search service, a content providing service, etc.) to the plurality of electronic devices 110, 120, 130, and 140 connected over the network 170.

Figure 2:
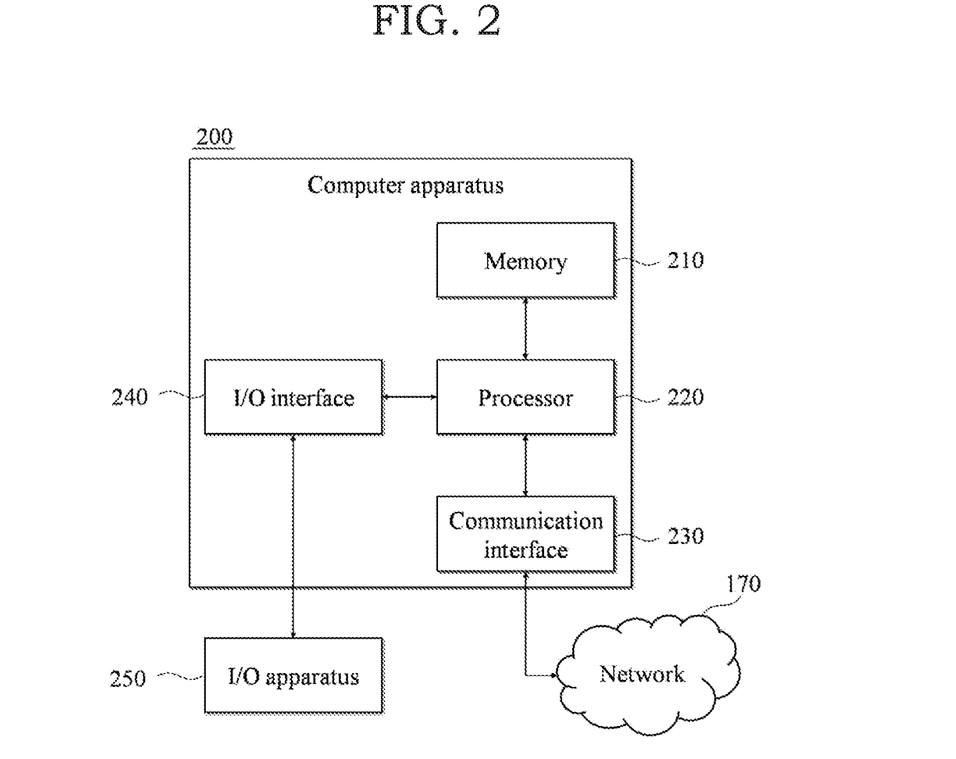
FIG. 2 is a diagram illustrating an example of a computer apparatus according to an example embodiment.

FIG. 2 is a block diagram illustrating an example of a computer apparatus according to an example embodiment. Each of the plurality of electronic devices 110, 120, 130, and 140 of FIG. 1 or each of the servers 150 and 160 may be implemented by a computer apparatus 200 of FIG. 2.

Referring to FIG. 2, the computer apparatus 200 may include a memory 210, a processor 220, a communication interface 230, and an input/output (I/O) interface 240. The memory 210 may include a permanent mass storage device, such as a random access memory (RAM), a read only memory (ROM), and a disk drive, as a computer-readable record medium. The permanent mass storage device, such as ROM and a disk drive, may be included in the computer apparatus 200 as a permanent storage device separate from the memory 210. Also, an OS and at least one program code may be stored in the memory 210. Such software components may be loaded to the memory 210 from another computer-readable record medium separate from the memory 210. The other computer-readable record medium may include a computer-readable record medium, for example, a floppy drive, a disk, a tape, a DVD/CD-ROM drive, a memory card, etc. According to other example embodiments, software components may be loaded to the memory 210 through the communication interface 230, instead of the computer-readable record medium. For example, the software components may be loaded to the memory 210 of the computer apparatus 200 based on a computer program installed by files received over the network 170.

The processor 220 may be configured to process instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the communication apparatus 200 and another apparatus (e.g., the aforementioned storage devices) over the network 170. For example, the processor 220 of the computer apparatus 200 may forward a request or an instruction created based on a program code stored in the storage device such as the memory 210, data, and a file, to other apparatuses over the network 170 under the control of the communication interface 230. Inversely, a signal, an instruction, data, a file, etc., from another apparatus may be received at the computer apparatus 200 through the communication interface 230 of the computer apparatus 200. For example, a signal, an instruction, data, etc., received through the communication interface 230 may be forwarded to the processor 220 or the memory 210, and a file, etc., may be stored in a storage medium (e.g., the permanent storage device) further includable in the computer apparatus 200.

The VO interface 240 may be a device used for interfacing with an I/O apparatus 250. For example, an input device of the VO apparatus 250 may include a device, such as a microphone, a keyboard, a mouse, etc., and an output device of the I/O apparatus 250 may include a device, such as a display, a speaker, etc. As another example, the I/O interface 240 may be a device for interfacing with an apparatus in which an input function and an output function are integrated into a single function, such as a touchscreen. The I/O apparatus 250 may be configured as a single apparatus with the computer apparatus 200.

Also, according to other example embodiments, the number of component included in the computer apparatus 200 may be greater or less than the number of components shown in FIG. 2. For example, the computer apparatus 200 may include at least a portion of the I/O apparatus 250, or may further include other components, for example, a transceiver, a database, etc.

Figure 3:
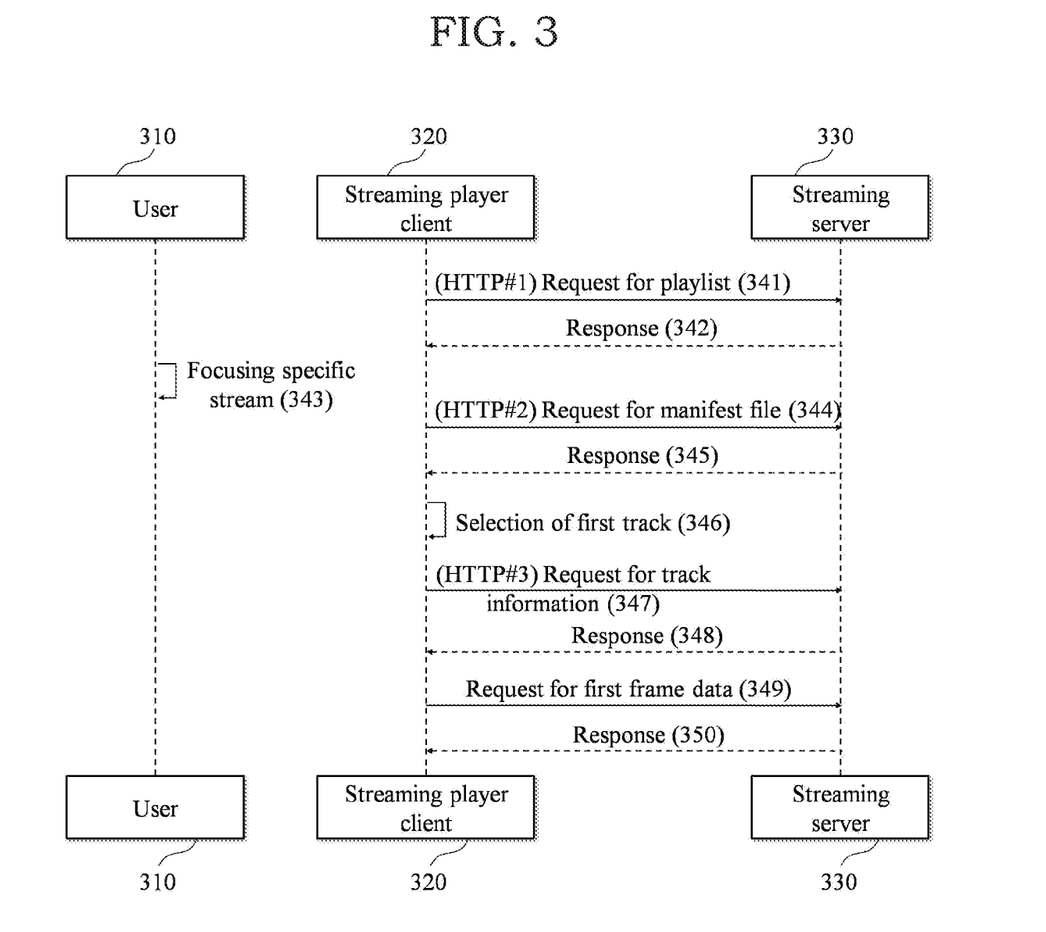
FIG. 3 illustrates an example of a basic operation of an existing streaming service.

FIG. 3 illustrates an example of a basic operation of an existing streaming service. FIG. 3 illustrates a user 310, a streaming player client 320, and a streaming server 330. Here, the streaming player client 320 may be a software module installed and executed on a terminal device of the user 310 to receive a streaming service. The streaming server 330 may correspond to a software module installed and executed on a server device that provides the streaming service.

A first process 341 may be an example of a process in which the streaming player client 320 requests the streaming server 330 for a playlist (e.g., playinfo of HLS) (HTTP #1). A second process 342 may be an example of a process in which the streaming server 330 responds to the request from the streaming player client 320. For example, in the second process 342, the streaming server 330 may provide the playlist to the streaming player client 320.

A third process 343 may be an example in which the user 310 focuses on a specific stream included in the playlist. For example, the user 310 may focus on a feature stream by placing a mouse over an area on which a desired stream among a plurality of streams included in the displayed playlist is displayed (mouse over).

A fourth process 344 may be an example of a process in which the streaming player client 320 requests the streaming server 330 for a manifest file (e.g., master.m3u8 of HLS) (HTTP #2). A fifth process 345 may be an example of a process in which the streaming server 330 responds to the request from the streaming player client 320. For example, in the fifth process 345, the streaming server 330 may provide the manifest file to the streaming player client 320.

A sixth process 346 may be an example of a process in which the streaming player client 320 selects a first track (#n). A single video file may be prepared using tracks for the respective different bitrates and the streaming player client 320 may select a track of a necessary bitrate. Here, since the streaming player client 320 is unaware of its bitrate at first, the streaming player client 320 selects the first track as in the sixth process 346.

A seventh process 347 may be an example of a process in which the streaming player client 320 requests the streaming server 330 for track information (e.g., #n playlist.m3u8 of HLS) of the selected track (HTTP #3) and an eighth process 348 may be an example of a process in which the streaming server 330 responds to the request from the streaming player client 320. For example, in the eighth process 348, the streaming server 330 may provide the requested track information to the streaming player client 320.

A ninth process 349 may be an example of a process in which the streaming player client 320 requests the streaming server 330 for first frame data, and a tenth process 350 may be an example of a process in which the streaming server 330 responds to the request from the streaming player client 320. For example, in the tenth process 350, the streaming server 330 may provide first frame data (e.g., 0.ts of HLS) to the streaming player client 320.

As described above, the existing streaming service needs to make three HTTP requests (HTTP #1, HTTP #2, and HTTP #3) that sequentially request the playlist, the manifest file, the track information, and the like, before downloading first frame data according to a standard.

Figure 4:
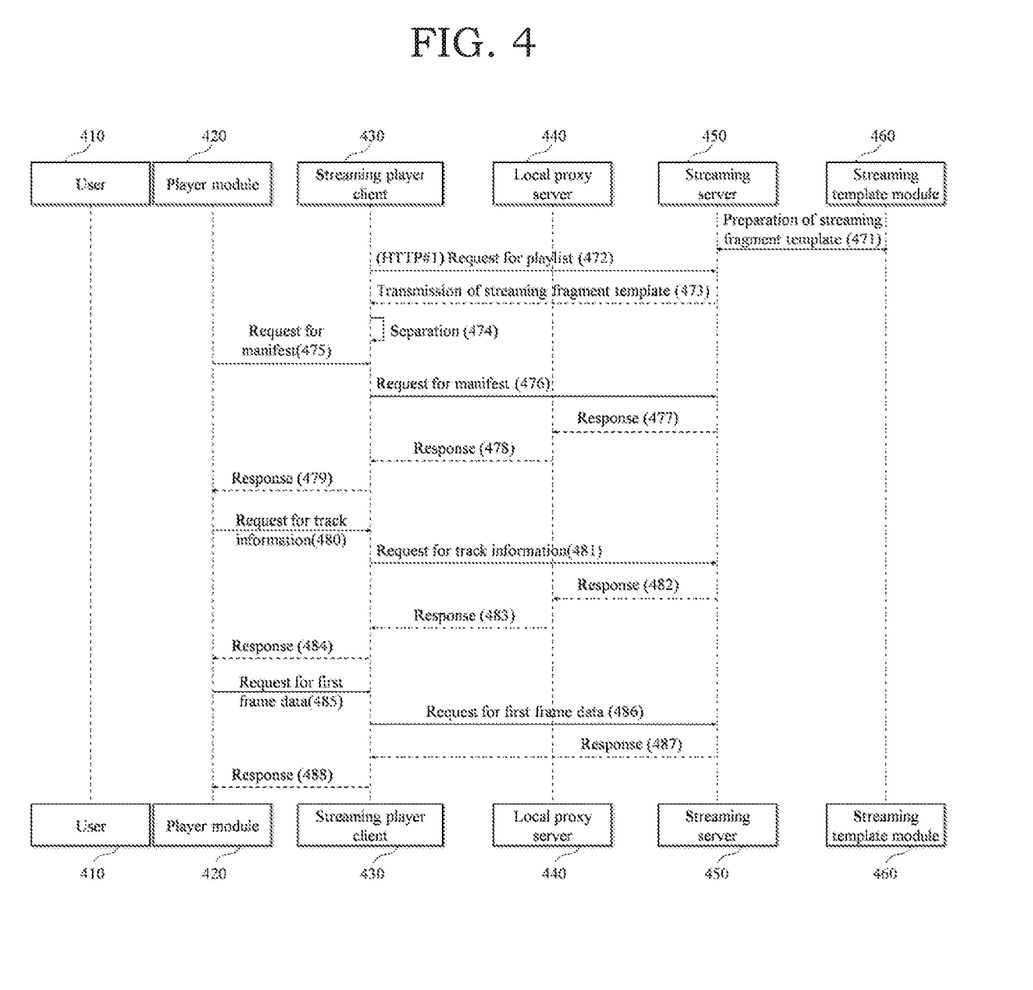
FIG. 4 illustrates an example of a basic operation of a streaming service to which a streaming fragment template is applied according to an example embodiment.

FIG. 4 illustrates an example of a basic operation of a streaming service to which a streaming fragment template is applied according to an example embodiment. FIG. 4 illustrates a user 410, a player module 420, a streaming player client 430, a local proxy server 440, a streaming server 450, and a streaming template module 460. Here, the player module 420 may be a software module installed and executed on a terminal device of the user 410 for playback of streaming content, and the streaming player client 420 and the local proxy server 440 may be a software module installed and executed on the terminal device of the user 410 to receive the streaming service. Also, the streaming server 450 and the streaming template module 460 may be a software module installed and executed on a server device to provide a streaming service. Here, the software module may correspond to the computer program installed and executed on the computer apparatus 200.

A first process 471 may be an example of a process in which the streaming server 450 prepares a streaming fragment template through the streaming template module 460. Here, the streaming fragment template may include data that includes the aforementioned playlist, manifest file, and track information. Here, the streaming fragment template may include a manifest file and track information for each of all the streams included in the playlist. In other words, the streaming server 450 may generate a streaming fragment template including the manifest file and the track information for each of all the streams included in the play list.

A second process 472 may be an example of a process in which the streaming player client 430 requests the streaming server 450 for a playlist (HTTP #1), and a third process 473 may be an example of a process in which the streaming server 450 responds to the request from the streaming player client 430. Here, the streaming server 450 may transmit, to the streaming player client 430, the streaming fragment template that includes the playlist, the manifest file, and the track information.

That is, in the example embodiment, the streaming server 450 may prepare the streaming fragment template through the streaming template module 460 and may transmit, to the streaming player client 430, the streaming fragment template that includes the playlist, the manifest file, and the track information as well the requested playlist in response to the request from the streaming player client 430. Therefore, all of the necessary playlist, manifest file, and track information may be acquired with only one HTTP request for the playlist.

A fourth process 474 may be an example of a process in which the streaming player client 430 separates the playlist, the manifest file, and the track information from the streaming fragment template. For example, the streaming player client 430 may separate the playlist, the manifest file, and the track information by parsing data provided as the streaming fragment template. As described above, the streaming fragment template may include the manifest file and the track information for each of the entire streams included in the playlist.

Requests in subsequent processes may proceed through not an HTTP request but a general request. As described above, a fragment template acquired through one-time HTTP request may include all of the playlist, the manifest file, and the track information, and the acquired playlist, manifest file, and track information may be cached in a local storage. Here, the local proxy server 440 may improve a response performance for cached items by hooking a request from the player module 420 and by responding thereto using the cached playlist, manifest file, and track information. That is, an HTTP request is a general form of transmitting a request to external Internet and receiving a response therefrom and accordingly requires an amount of time according to a network status. In contrast, a general request relates to returning and processing cached and edited internal data by hooking, by the local proxy server 440, the request from the player module 420. Here, since the local proxy server 440 immediately returns requested information (information that is acquired through the cached playlist, manifest file, and track information), a network status is not affected and the request may be very quickly processed.

A fifth process 475 may be an example of a process in which the player module 420 requests the streaming player client 430 for the manifest file, and a sixth process 476 may be an example of a process in which the streaming player client 430 requests the streaming server 450 for the manifest file. Also, a seventh 477 may be an example in which the streaming server 450 transmits a response to the local proxy server 440, and an eighth process 478 may be an example of a process in which the local proxy server 440 transmits the response to the streaming player client 430. Here, practically, since the manifest file is already cached, the local proxy server 440 may transmit the cached manifest file to the streaming player client 430 by hooking the request to the streaming server 450. Therefore, the seventh process 477 and the eighth process 478 may be shortened to a process in which the local proxy server 440 transmits the cached manifest file to the streaming player client 430 by hooking the request from the streaming player client 430. As described above, not the HTTP request but the general request relates to returning and processing internal data locally. Therefore, the general request may be quickly processed compared to the HTTP request.

A ninth process 479 may be an example of a process in which the streaming player client 430 transmits the manifest file to the player module 420. Here, the streaming player client 430 may transmit, to the player module 420, the requested manifest file among the manifest files separated in the fourth process 474.

A tenth process 480 may be an example of a process in which the player module 420 requests the streaming player client 430 for the track information, and an eleventh process 481 may be an example of a process in which the streaming player client 430 requests the streaming server 450 for the track information. Here, since the track information is already transmitted to the streaming player client 430 through the third process 473, the streaming player client 430 may transmit not the HTTP request but the general request to the streaming server 450. Also, a twelfth process 482 may be an example of a process in which the streaming server 450 transmits a response to the local proxy server 440, and a thirteenth 483 may be an example of a process in which the local proxy server 440 transmits the response to the streaming player client 430. Even in this case, practically, since the track information is already cached, the local proxy server 440 may transmit the cached track information to the streaming player client 430 by hooking the request to the streaming server 450. Therefore, the twelfth process 482 and the thirteenth 483 may be shortened to a process in which the local proxy server 440 transmits the cached track information to the streaming player client 430 by hooking the request from the streaming player client 430. As described above, not the HTTP request but the general request relates to returning and processing internal data locally. Therefore, the general request may be quickly processed compared to the HTTP request.

A fourteenth process 484 may be an example of a process in which the streaming player client 430 transmits the track information to the player module 420. Here, the streaming player client 430 may transmit the requested track information among the plurality of pieces of track information separated in the fourth process 474 to the player module 420.

A fifteenth process 485 may be an example of a process in which the player module 420 requests the streaming player client 430 for first frame data. A sixteenth process 486 may be an example of a process in which the streaming player client 430 requests the streaming server 450 for the first frame data.

A seventeenth process 487 may be an example of a process in which the streaming server 450 transmits a response to the streaming player client 430. Here, the first frame data (e.g., 0.ts of HLS) may be included in the response.

An eighteenth process 488 may be an example of a process in which the streaming player client 430 transmits the first frame data to the player module 420.

As described above, the example embodiment may reduce three HTTP requests to a single HTTP request and may reduce a playtime of streaming content by transmitting a manifest file and track information for each of streams included in a playlist through a streaming fragment template in response to a first HTTP request for the playlist.

The following Table 1 shows an example of a structure of a streaming fragment template for HLS and the following Table 2 shows an example of a response sample of a playlist (playinfo) for HLS.

TABLE 1

| Position | Description |
| --- | --- |
| streams[ ] | master.m3u8 information of contents |
| streams[ ].source | Existing playlist.m3u8 file, not used in example embodiments. |
| streams[ ].videos[ ] | Content corresponding to a playlist |
| streams[ ].videos[ ].template.body.bandwidth | Bandwidth for each track |
| streams[ ].videos[ ].template.body.width, height | Resolution per track |
| streams[ ].videos[ ].template.body.format | Template for TS file request |
| streams[ ].videos[ ].template.body.extInfos | #EXTINF content |

TABLE 2

```
{
  "meta": {
    "masterVideoId": "6CF98633650E80D6D70AF4E6810851D4D8A5",
    "contentId": "b2c1c4ba5c65f94c35b83e465a17e820",
    "count": 36,
    "subject": "\uAE00\uC81C\uBAA9\uC785\uB2C8\uB2E4.",
  },
  "streams": [
    {
      "type": "HLS",
      "hasTemplate": "true",
      "dimension": "normal",
      "keys": [
        {
          "type": "param",
          "name": "_lsu_sa_",
          "value": "63252cfec1826446c6d8a5a3616520bf3ed63fe8e4086f7c37c70fc797b638550d295a536745810190c93be2ca3d8bdf8843668d5b8b466c7f4929b24ecb312f0b443ad82c8e207e699e927b567c69dd0e92d13b3da9318a69c1a4680a9d24d471b2b0c65b7e4c720aac36211601b80f363bc6265a623abc691d70a7644ad082"
        }
      ],
      "source": "http://gladvod.akamaized.net/xglad/glad_2019_01_04_10/hls/7fcd5aa0-0fe6-11e9-8881-246e96398ca5.m3u8",
      "sourceFrom": "AM",
      "videos": [
        {
          "id": "6DB56A2A628398A105681D496879EB567A69",
          "encodingOption": {
            "id": "1080P_1920_5120_192",
            "name": "1080P",
            "width": 1920,
            "height": 1080
          },
          "bitrate": {
            "video": 4401.0,
            "audio": 192.0
          },
          "source": "http://glad190530vod.akamaized.net/xglad/glad_2019_01_04_10/h ls/73f150c5-0fe6-11e9-8881-246e96398ca5.m3u8",
          "template": {
            "type": "HLS_V3",
            "body": {
              "bandwidth": 4703232,
              "resolution": "1920x1080",
              "format": "73f150c5-0fe6-11e9-8881-246e96398ca5-%06d.ts",
              "version": 3,
              "mediaSequence": 0,
              "extInfos": [
                3.93,
                3.93,
                3.93,
                5.90,
                3.93,
                3.93,
              ]
            }
          }
        },
        {
          "id": "A8E119DA258AA697059A9C10D470C76C3F1F",
          "encodingOption": {
            "id": "144P_256_100_64",
            "name": "144P",
            "width": 256,
            "height": 144
          },
          "bitrate": {
            "video": 117.0,
            "audio": 64.0
          },
          "source": "http://gladvod.akamaized.net/xglad/glad_2019_01_04_10/hls/c 643f30f-0fe5-11e9-8881-246e96398ca5.m3u8",
          "template": {
            "type": "HLS_V3",
            "body": {
```

TABLE 2-continued

```
            "bandwidth": 185344,
            "resolution": "256x144",
            "format": "c643f30f-0fe5-11e9-8881-
246e96398ca5-%06d.ts",
            "version": 3,
            "mediaSequence": 0,
            "extInfos": [
               3.93,
               3.93,
               3.93,
               5.90,
               3.93,
               3.93,
               3.93,
            ]
          }
        }
      },
    ]
  }
 ],
}
```

Figure 5:
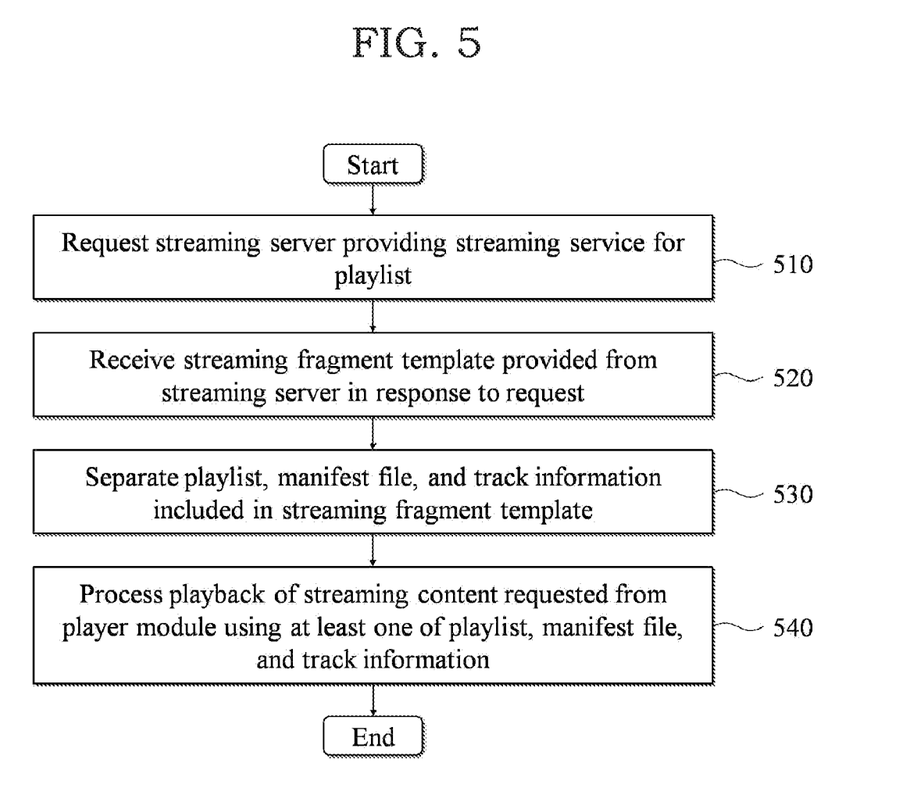
FIG. 5 is a flowchart illustrating an example of a streaming content playback method of a client according to an example embodiment.

FIG. 5 is a flowchart illustrating an example of a streaming content playback method of a client according to an example embodiment. The streaming content playback method of FIG. 5 may be performed by the computer apparatus 200 that implements a client of a streaming service. In this case, the processor 220 of the computer apparatus 200 may be implemented to execute a control instruction according to a code of at least one program or a code of an OS included in the memory 210. Here, the processor 220 may control the computer apparatus 200 to perform operations 510 to 540 included in the method of FIG. 5 in response to the control instruction provided from the code stored in the computer apparatus 200. In operation 510, the computer apparatus 200 may request a streaming server providing a streaming service for a playlist. The request for the playlist may include an HTTP request processed through HTTP. Such operation 510 may correspond to, for example, the second process 472 of FIG. 4.

In operation 520, the computer apparatus 200 may receive a streaming fragment template provided from the streaming server in response to the request. Here, the streaming fragment template may be generated in the streaming server to include the playlist, a manifest file for each of streams included in the playlist, and track information for each of the streams. Such operation 520 may correspond to, for example, the third process 473 of FIG. 4.

In operation 530, the computer apparatus 200 may separate the playlist, the manifest file, and the track information included in the streaming fragment template. For example, the computer apparatus 200 may separate the playlist, the manifest file, and the track information by parsing data corresponding to the streaming fragment template. As described above, the streaming fragment template may be generated to include the playlist, the manifest file for each of streams included in the playlist, and the track information for each of the streams. Therefore, the computer apparatus 200 may separate the playlist, manifest files for the respective streams, and the track information for the respective streams. Such operation 530 may correspond to, for example, the fourth process 474 of FIG. 4. Here, the computer apparatus 200 may cache the separated playlist, manifest file, and track information in a local storage.

In operation 540, the computer apparatus 200 may process playback of streaming content requested from a player module using at least one of the playlist, the manifest file, and the track information. Here, the computer apparatus 200 may hook a request for at least one of the manifest file and the track information from the player module through a local proxy server and may provide at least one of the cached manifest file and track information to the player module in response to the hooked request and process playback of the streaming content. Operation 540 may correspond to, for example, the fifth process 475, the sixth process 476, the eighth process 478, the tenth process 480, the eleventh process 481, and the thirteenth process 483 to eighteenth process 488.

Figure 6:
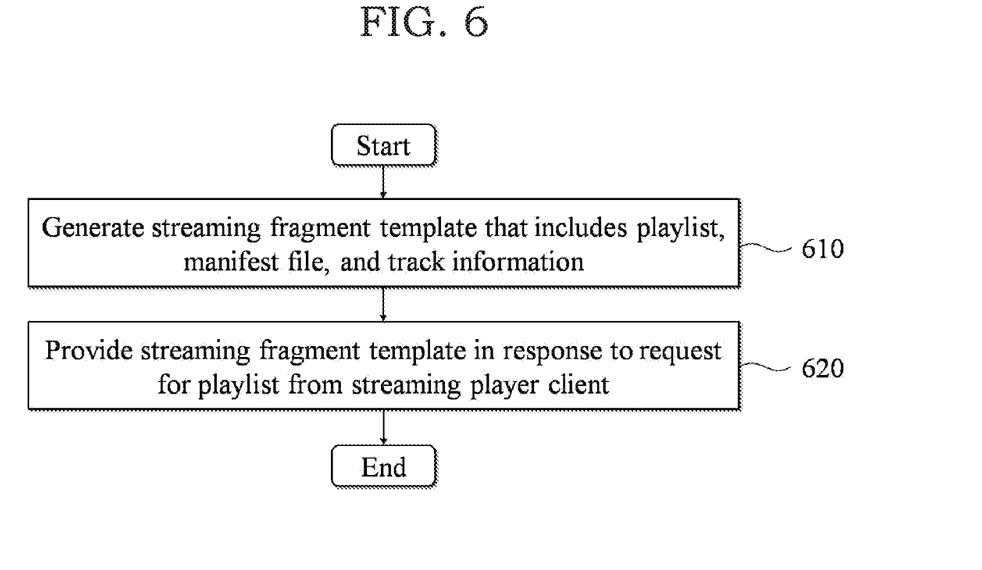
FIG. 6 is a flowchart illustrating an example of a streaming content playback method of a server according to an example embodiment.

FIG. 6 illustrates an example of a streaming content playback method of a server according to an example embodiment. The streaming content playback method according to the example embodiment may be performed by the computer apparatus 200 that implements a server configured to provide a streaming service. In this case, the processor 220 of the computer apparatus 200 may be implemented to execute a control instruction according to a code of at least one program or a code of an OS included in the memory 210. Here, the processor 220 may control the computer apparatus 200 to perform operations 610 to 620 included in the method of FIG. 6 in response to the control instruction provided from the code stored in the computer apparatus 200.

In operation 610, the computer apparatus 200 may generate a streaming fragment template that includes a playlist, a manifest file, and track information. Here, the computer apparatus 200 may generate the streaming fragment template to include the playlist, a manifest file for each of streams included in the playlist, and track information for each of the streams. Such operation 610 may correspond to, for example, the first process 471 of FIG. 4.

In operation 620, the computer apparatus 200 may provide the streaming fragment template in response to a request for the playlist from a client. Here, the request for the playlist from the client may be received through HTTP. In this case, since all of the playlist, the manifest file, and the track information are transmitted to a streaming player client in response to a single HTTP request, it is possible to reduce the number of HTTP requests. Operation 620 may correspond to, for example, the third process 473 of FIG. 4.

The aforementioned operation 520 of FIG. 5 is performed by the client and the client may receive the streaming fragment template and may process playback of the streaming content using the same. For example, the playlist, the manifest file, and the track information included in the streaming fragment template may be cached by the client and a local proxy server further included by the client may hook a request for at least one of the manifest file and the track information from a player module included in the client and may provide at least one of the cached manifest file and track information to the player module and process the hooked request.

Therefore, after a single HTTP request for the playlist from the client, all the manifest file and the track information are used in a cached state by the client. Therefore, a playtime of the streaming content may be reduced by removing HTTP requests for the manifest file and the track information. Such a process may correspond to the sixth process 476, the seventh process 477, the eleventh process 481, the twelfth process 482, the sixteenth process 486, and the seventeenth process 487. As described above, the seventh process 477 and the eighth process 478 may be reduced to the process in which the local proxy server 440 transmits the cached manifest file to the streaming player client 430 by hooking the request from the streaming player client 430. The twelfth process 482 and the thirteenth process 483 may be reduced to the process in which the local proxy server 440 transmits the cached track information to the streaming player client 430 by hooking the request from the streaming player client 430.

As described above, according to some example embodiments, it is possible to reduce the number of consecutive requests, such as a request for a content list, a request for a manifest file, a request for track information, and a request for a fragment file, in a streaming service of HTTP Live Streaming (HLS), Moving Picture Experts Group—Dynamic Adaptive Streaming over HTTP (MPEG-DASH), MPEG-4 (mp4), and the like.

The systems or apparatuses described herein may be implemented using hardware components or a combination of hardware components and software components. For example, the apparatuses and the components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, virtual equipment, a computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in computer-readable media. The media may include, in combination with program instructions, data files, data structures, and the like. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are configured to store program instructions, such as read-only memory (ROM), random access memory (RAM), flash memory, and the like. Examples of other media may include record media and storage media managed by an app store that distributes applications or a site that supplies and distributes other various types of software, a server, and the like. Examples of the program instruction may include a machine code as produced by a compiler and include a high-language code executable by a computer using an interpreter and the like.

Although the example embodiments are described with reference to some specific example embodiments and accompanying drawings, it will be apparent to one of ordinary skill in the art that various alterations and modifications in form and details may be made in these example embodiments without departing from the spirit and scope of the claims and their equivalents. For example, suitable results may be achieved if the described techniques are performed in different order, and/or if components in a described system, architecture, device, or circuit are combined in a different manner, and/or replaced or supplemented by other components or their equivalents.

Therefore, other implementations, other example embodiments, and equivalents of the claims are to be construed as being included in the claims.

What is claimed is:

1. A non-transitory computer-readable recording medium storing a computer program for enabling a computer apparatus to execute a streaming content playback method, the method comprising:
   requesting a streaming server providing a streaming service for a playlist;
   receiving a streaming fragment template, which includes the playlist, a manifest file for each of streams included in the playlist, and track information for each of the streams, provided from the streaming server in response to the request for the playlist;
   separating the playlist, the manifest file, and the track information included in the streaming fragment template; and
   processing playback of streaming content requested from a player module included in the computer apparatus using at least one of the playlist, the manifest file, and the track information.

2. The non-transitory computer-readable recording medium of claim 1, wherein the streaming content playback method further comprises caching the separated playlist, the manifest file, and the track information, and the processing of the playback of the streaming content comprises hooking a request for at least one of the manifest file and the track information from the player module and providing at least one of the cached manifest file and the track information to the player module in response to the hooked request and the processing of the playback of the streaming content.

3. A streaming content playback method performed by a computer apparatus having at least one processor, the method comprising:

requesting, by the at least one processor, a streaming server providing a streaming service for a playlist;

receiving, by the at least one processor, a streaming fragment template, which includes the playlist, a manifest file for each of streams included in the playlist, and track information for each of the streams, provided from the streaming server in response to the request for the playlist;

separating, by the at least one processor, the playlist, the manifest file, and the track information included in the streaming fragment template; and processing, by the at least one processor, playback of streaming content requested from a player module included in the computer apparatus using at least one of the playlist, the manifest file, and the track information.

4. The streaming content playback method of claim 3, further comprising:

caching the separated playlist, the manifest file, and the track information, wherein the processing of the playback of the streaming content comprises hooking a request for at least one of the manifest file and the track information from the player module and providing at least one of the cached manifest file and track information to the player module in response to the hooked request and the processing of the playback of the streaming content.

* * * * *